(12) United States Patent
Uno

(10) Patent No.: US 6,421,043 B1
(45) Date of Patent: Jul. 16, 2002

(54) MOVABLE COORDINATE INPUTTING APPARATUS

(75) Inventor: Kinji Uno, Tokyo (JP)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/556,940

(22) Filed: Apr. 21, 2000

(30) Foreign Application Priority Data

Apr. 23, 1999 (JP) .......................................... 11-116281

(51) Int. Cl.[7] .................................................. G09G 5/08
(52) U.S. Cl. ...................................... 345/158; 345/156
(58) Field of Search ................................. 345/156, 163, 345/164, 167, 161, 165, 166, 158; 463/37

(56) References Cited

U.S. PATENT DOCUMENTS 5,489,922 A * 2/1996 Zloof .......................... 345/156
5,923,318 A * 7/1999 Zhai et al. ................... 345/156

FOREIGN PATENT DOCUMENTS

| EP | 729112 A2 * | 8/1996 | ........... G06K/11/18 |
| JP | 05-333996 A1 * | 12/1993 | ........... G06F/3/033 |

* cited by examiner

Primary Examiner—Richard Hjerpe
Assistant Examiner—Alexander Eiser
(74) Attorney, Agent, or Firm—Birch, Stewart, Kolasch & Birch, LLP

(57) ABSTRACT

The present invention relates to a movable coordinate input apparatus. An object of the present invention is to provide a small size movable coordinate input apparatus which is well adapted to a conventional movable coordinate input apparatus. In the present invention, there is provided a movable coordinate input apparatus which includes a ball, and a cylindrical hollow ball holder wherein the ball includes an insulation portion formed in a net shape on a surface of the same and having a conductive characteristic, and the ball holder includes a ceiling plate on the top portion of the same, a conductive ceiling plate portion contacting with the ball when the ball holder is placed on a floor surface, and an angle sensor having an electrical resistance surface contacting with the ball on an inner surface of the ball holder.

10 Claims, 9 Drawing Sheets

MOVABLE COORDINATE INPUTTING APPARATUS

BACKGROUND OF THE INVENTION

1. Field of the Invention

The present invention relates to a movable coordinate inputting apparatus, and in particular to a movable coordinate inputting apparatus such as an input apparatus adapted to a mouse or a touch panel for a personal computer.

2. Description of the Background Art

FIG. 1 illustrates the construction of a mouse as an example of a conventional movable coordinate inputting apparatus. As shown therein, a conventional apparatus for inputting a movable coordinate when a coordinate input apparatus 1 is moved on a certain surface includes a ball 2 moved based on a rotation of the coordinate input apparatus 1, an X-direction shaft 3 contacting with the ball 2 and rotating based on an X-direction component of a rotation force of the ball, a Y-shaft direction shaft 4 rotating based on a Y-direction component of a rotation force of the ball 2, a X-direction circular plate 5 fixed at one end of the X-direction shaft 3, and a Y-direction circular plate 6 fixed at one end of the Y-direction shaft 4.

In the above-described conventional movable coordinate inputting apparatus, the ball 2 is rotated based on a movement of the coordinate input apparatus 1. The X-direction component and Y-direction component of the rotation speed and rotation direction of the ball 2 are transferred to the X-direction shaft 3 and the Y-direction shaft 4, and the X-direction circular plate and the Y-direction circular plate 6 are rotated.

FIG. 2 illustrates the X-direction circular plate 5 of FIG. 1 in the direction of the arrow A. The X-direction circular plate 5 includes a plurality of slits 7 formed at a regular distance for transmitting light therethrough, and a pair of photo sensors 8 and 9 for detecting the light transmitted the slits 7. The photo sensors 8 and 9 are installed so that one of the same is deviated from the position of the slit 7 when the other of the same is overlapped with one of the slit 7.

FIG. 3 illustrates wave forms of the photo sensors 8 and 9 when the X-direction circular plate 5 of FIG. 2 is rotated. As shown in FIG. 2, when the X-direction circular plate 5 is rotated in the clockwise direction(normal rotation), the photo sensor 8 outputs a pulse of a wave form as shown in (1) of FIG. 3, and the photo sensor 9 outputs a pulse of a wave form as shown in (2) of FIG. 3. In addition, when the X-direction circular plate 5 is rotated in the counter clockwise direction(reverse rotation) as shown in FIG. 2, the photo sensor 8 outputs a pulse of a wave form as shown in (3) of FIG. 3, and the photo sensor 9 outputs a pulse of a wave form as shown in (4) of FIG. 3.

Therefore, it is possible to check the rotation speed of the X-direction circular plate 5 based on the period T of the above-described pulses. In addition, since the photo sensors 8 and 9 are arranged in the above-described method, when the X-direction circular plate 5 is rotated in the normal direction, in the case that an output of the photo sensor 8 is changed from a high level to a low level, the output of the photo sensor 9 is a low level for thereby forming a certain phase difference. When the X-direction circular plate 5 is rotated in the reverse direction, in the case that an output of the photo sensor 8 is changed from a high level to a row level, the output of the photo sensor 9 is a high level for thereby a certain phase difference. Therefore, the rotation direction of the X-direction circular plate 5 is checked based on the above-described phase difference, and the rotation speed and rotation direction of the Y-direction circular plate 6 are detected.

The rotation speed and rotation direction of the X-direction circular plate 5 are X-direction components of the rotation speed and rotation direction of the coordinate input apparatus 1. In addition, the rotation speed and rotation direction of the Y-direction circular plate 6 are the Y-direction components of the rotation speed and rotation direction of the coordinate input apparatus 1. Therefore, it is possible to detect the moving speed and moving direction of the coordinate input apparatus based on the above-described components.

FIG. 4 illustrates wave forms for describing a measurement of the moving speed and moving direction of the coordinate input apparatus 1 using the pulse wave forms as shown in FIG. 3. (1) of FIG. 4 illustrates an output pulse of the photo sensor 8, and (2) of FIG. 4 illustrates an output pulse of the photo sensor 9. The moving speed and moving direction of the coordinate input apparatus 1 are obtained based on the following method. First, the numbers of the pulses(the output pulse of the photo sensor 9) are counted at the periods of S0, S1, S2, Sn−1, Sn+1.

The thusly obtained number of the counts represent a moving distance of the X-direction of the coordinate input apparatus 1 at each sampling period. The moving speed of the X-direction at each certain sampling period of the coordinate input apparatus 1 is computed based on the moving distance/sampling period. The moving direction of the X-direction of the coordinate input apparatus 1 is obtained by checking the output pulse of the photo sensor 8 at each sampling period when measuring the moving distance and the phase difference of the output pulse of the photo sensor 9 and judging whether the rotation is the normal direction or the reverse rotation direction.

The moving speed and moving direction are detected with respect to the Y-direction in the same manner.

The thusly obtained moving speed and moving direction of the X-direction and Y-direction of the coordinate input apparatus 1 are inputted into a microcomputer(not shown), and the moving speed and moving direction of the coordinate input apparatus 1 are computed and then outputted.

In the conventional coordinate input apparatus, two shafts rotating based on a contact with the ball 2, two rotation circular plates having the slits, four sensors for measuring the rotation speed and rotation direction of two rotation circular plates are provided. Therefore, the number of components and the size of the product are increased.

SUMMARY OF THE INVENTION

Accordingly, it is an object of the present invention to provide a small-sized movable coordinate input apparatus which is well adapted to a conventional system for a movable coordinate input apparatus.

To achieve the above object, there is provided a movable coordinate input apparatus which includes a ball, and a cylindrical hollow ball holder wherein the ball includes an insulation portion formed in a net shape on a surface of the same and having a conductive characteristic, and the ball holder includes a ceiling plate on the top portion of the same, a conductive ceiling plate portion contacting with the ball when the ball holder is placed on a floor surface, and an angle sensor having an electrical resistance surface contacting with the ball on an inner surface of the ball holder.

A coordinate movement and moving speed are obtained by moving the ball holder in a state that the apparatus is placed on the floor surface.

A coordinate movement and moving speed are obtained by rotating a portion contacting with the floor surface of the ball using a finger.

The ball holder is formed in a cylindrical shape having a certain space therein in which the ball is movable.

The ball holder is formed in a polygonal cylindrical shape having a certain space therein in which the ball is movable.

The electrical insulation portion formed on the surface of the ball is formed in a rectangular net shape.

The electrical insulation portion formed on the surface of the ball is formed in a polygonal net shape.

The electrical insulation portion formed on the surface of the ball is formed in a circular net shape.

The electrical insulation portion formed on the surface of the ball is formed by filling an insulation material.

The electrical insulation portion formed on the surface of the ball is formed of a groove having a certain depth for thereby obtaining a non-contact with the ceiling plate and the angle sensor.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
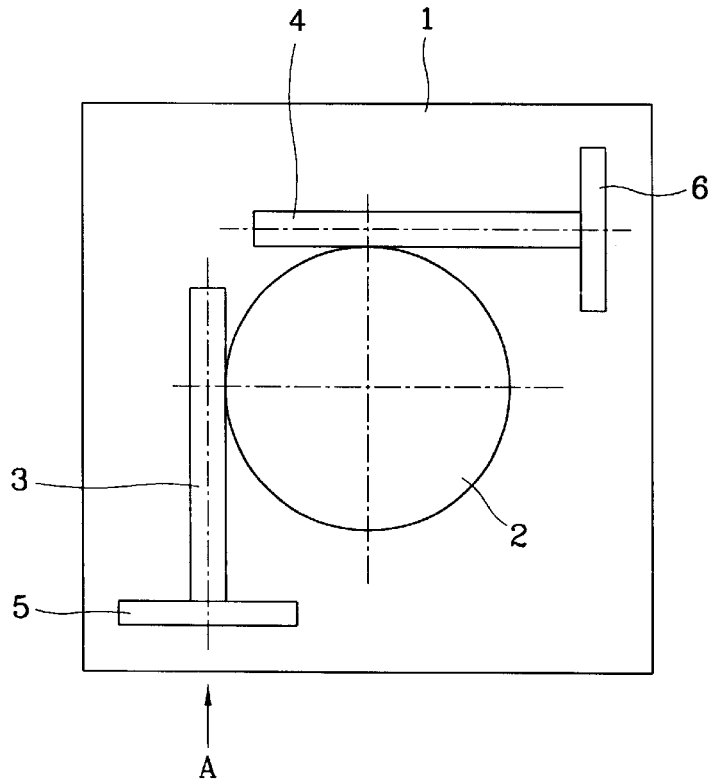
FIG. 1 is a plan view illustrating the construction of a mouse as an example of a conventional movable coordinate input apparatus.
Figure 2:
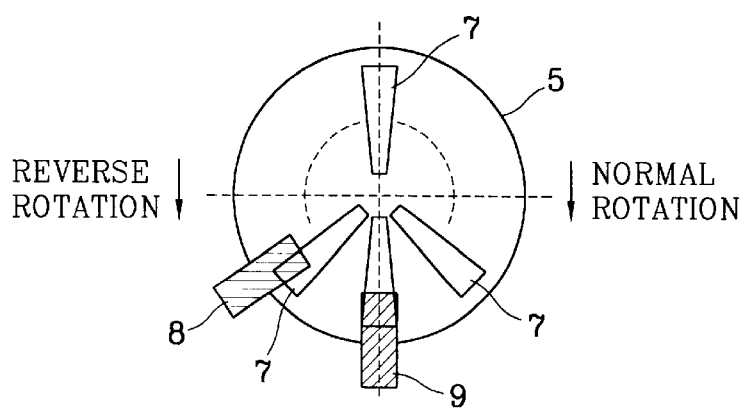
FIG. 2 is a plan view illustrating a X-direction circular plate of FIG. 1 in the direction of an arrow A.
Figure 3:
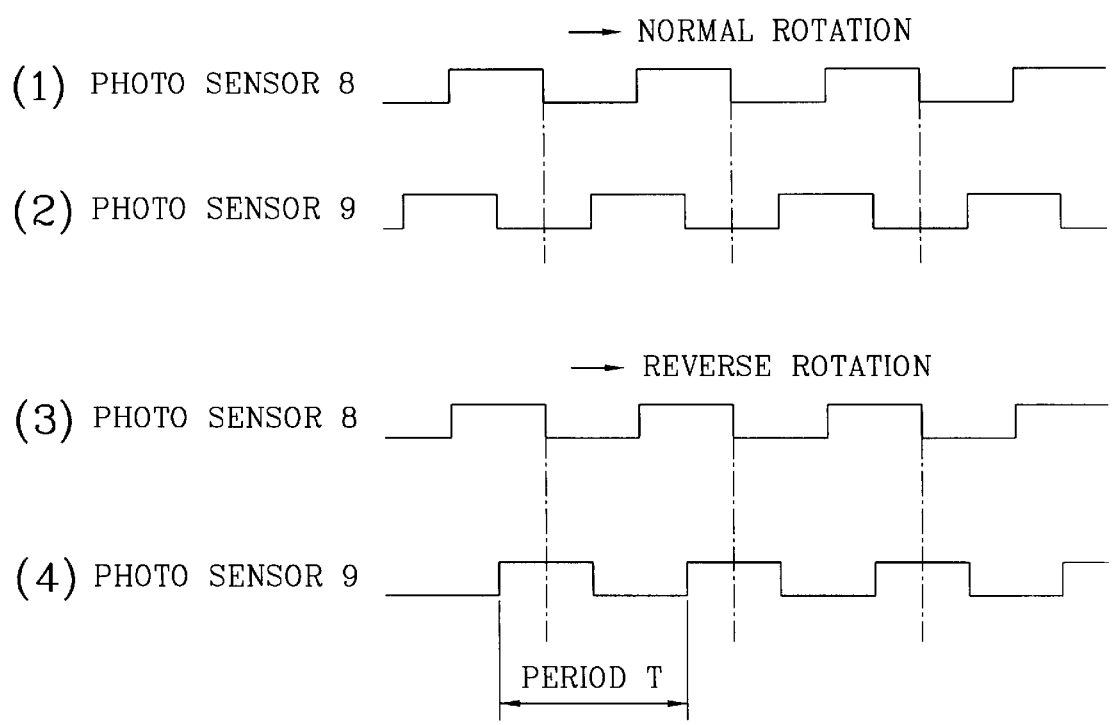
FIG. 3 illustrates output wave forms of a photo sensor when a X-direction circular plate of FIG. 2 is rotated.
Figure 4:
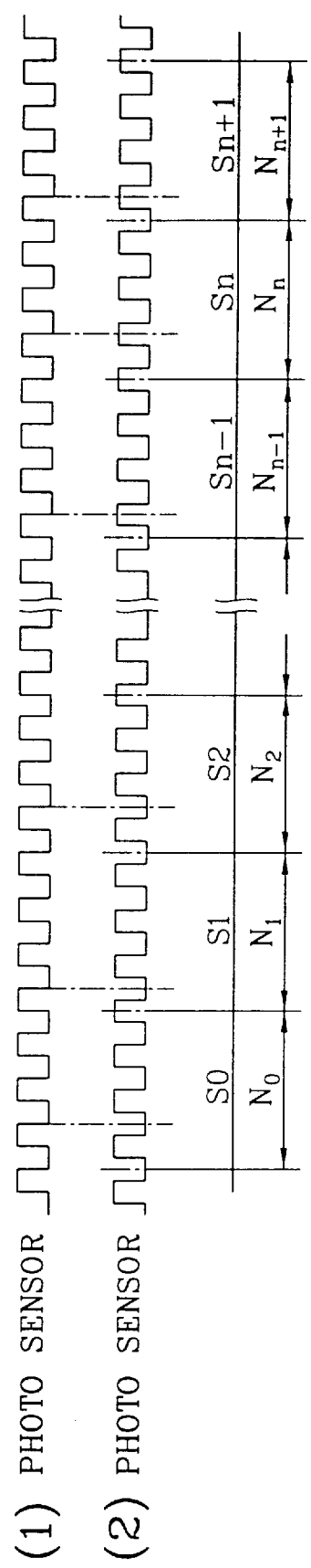
FIG. 4 illustrates wave forms for describing a measurement of a moving speed and moving direction of a coordinate input apparatus using a pulse wave form of FIG. 3.
Figure 5:
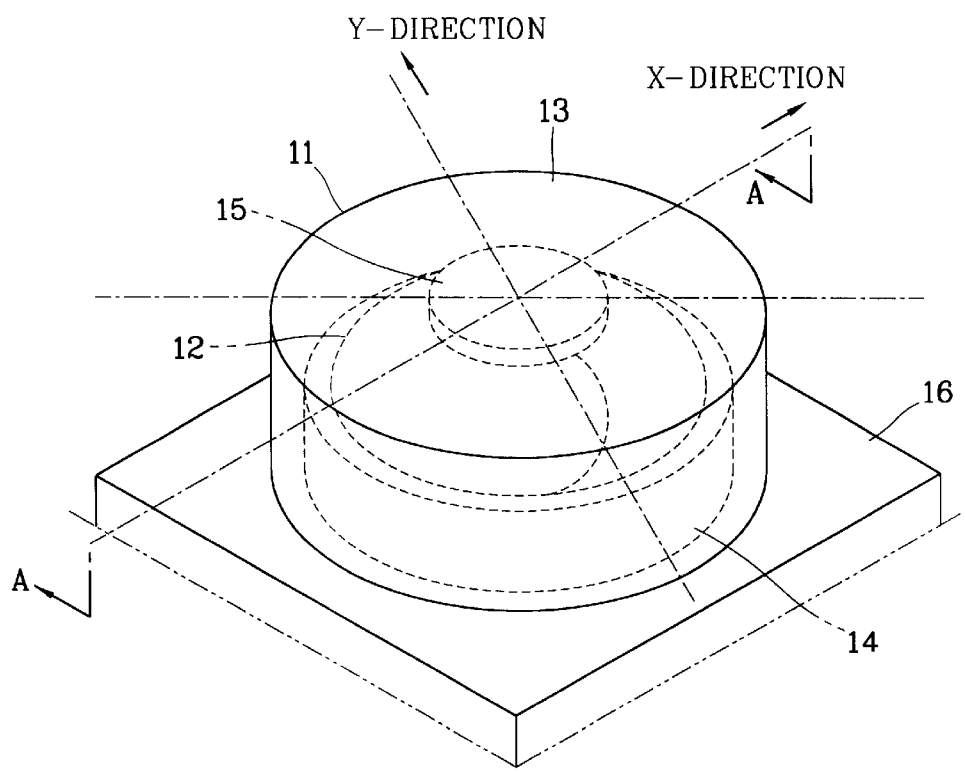
FIG. 5 is a perspective view illustrating an outer appearance of a movable coordinate input apparatus according to the present invention.
Figure 6:
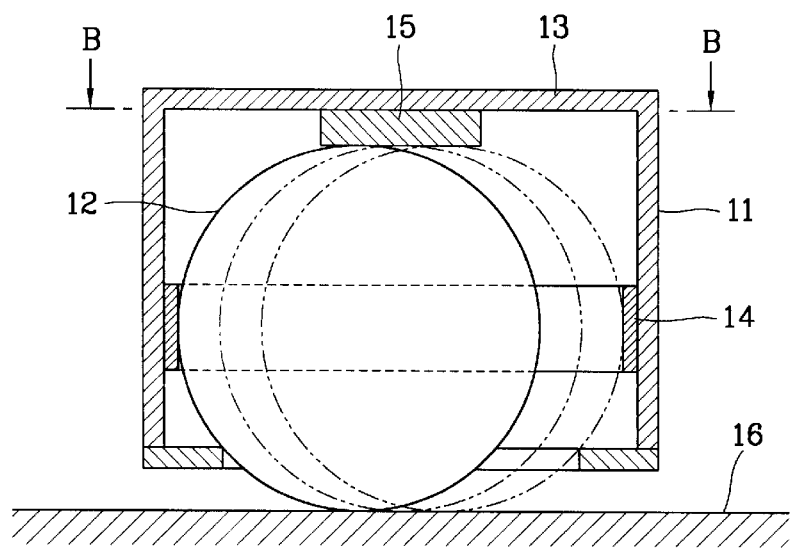
FIG. 6 is a cross-sectional view taken along line A—A of a coordinate input apparatus of FIG. 5.
Figure 7:
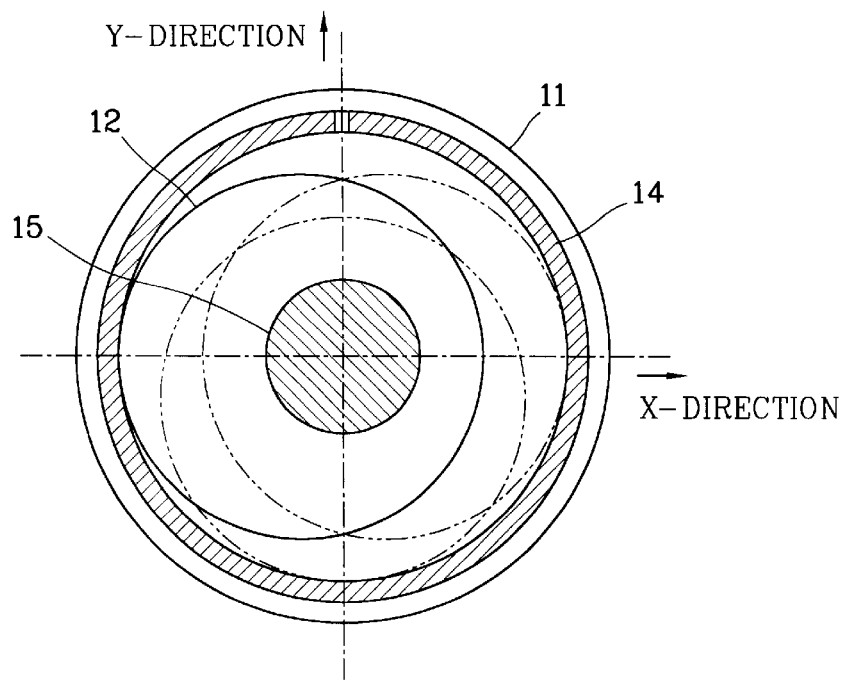
FIG. 7 is a cross-sectional view taken along line B—B of a coordinate input apparatus of FIG. 6.

FIG. 5 is a perspective view illustrating an outer appearance of a movable coordinate input apparatus according to the present invention, FIG. 6 is a cross-sectional view taken along line A—A of a coordinate input apparatus of FIG. 5, and FIG. 7 is a cross-sectional view taken along line B—B of a coordinate input apparatus of FIG. 6. As shown therein, the reference numeral 11 represents a ball holder, and 12 represents a ball held in the ball holder 11. The ball holder 11 is formed in a cylindrical shape and has a ceiling plate 13. An angle sensor 14 is installed at an inner portion of the cylindrical shape ball holder 11. A ceiling plate portion 15 is electrically conductive and is installed at the ceiling plate 13. In addition, the shape of the ball holder 11 is cylindrical. More preferably, the shape of the ball holder 11 may be formed in a polygonal shape.

The ball 12 is held in the ball holder 12 and contacts with a bottom surface 16 and is moved in the inner space of the ball holder 11 based on a movement of the ball holder 11. In addition, the ball 12 is electrically conductive, and an electrical insulation portion formed in a net shape is formed for measuring the rotation speed of the ball 12. The shape of the net may be rectangular, polygonal, or circular. The net is filled by an insulation material and is formed by a groove. The above-described electrical insulation portion is not shown in FIGS. 5 through 7 and FIG. 8A through FIG. 11.

In addition, the angle sensor 14 is held in the ball holder 11 and moves without any interference with the movement of the ball 12 based on a variation of a moving direction of the ball holder 11. Therefore, it is possible to produce a certain variation of the electrical signal with respect to the rotation angle(0°~360°)(the moving angle of the ball) of the ball 12 based on a reference direction from the center of the ceiling portion 15.

The ceiling portion 15 is electrically conductive and is fixed at the ceiling plate 13 of the ball holder 11 and moves without any interference with respect to a movement of the ball which is moved based on a variation of a moving direction of the ball 11. The ball holder 11 fixes the angle sensor 14 and the ceiling portion 15 and has a movable space of the ball 12 which is moved based on a moving direction of the ball 11 and supports the ball 12 which is movable on the bottom surface 16.

The operation of the present invention will be explained.

Figure 8A:
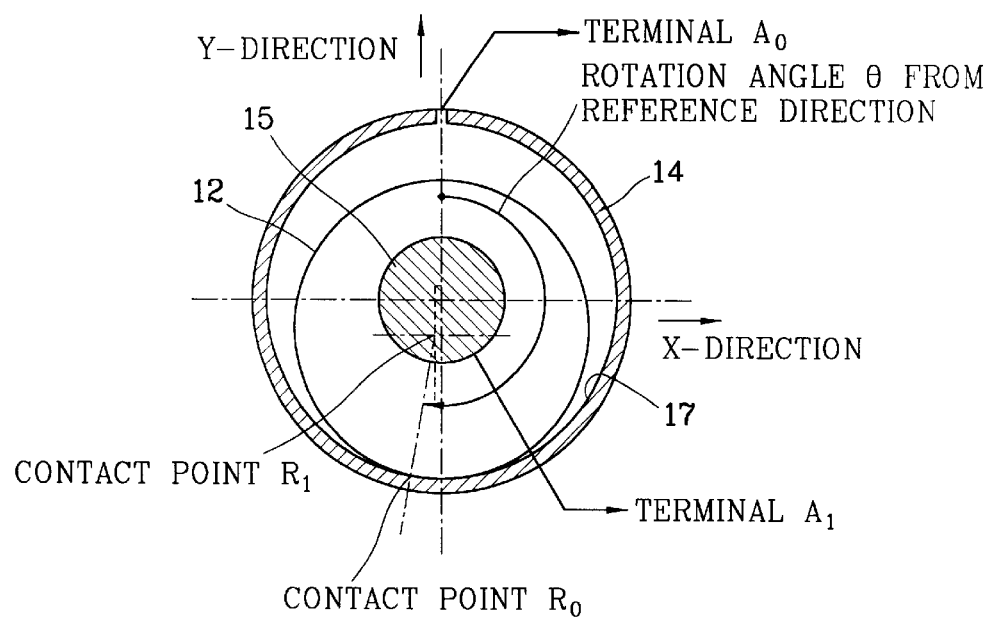
FIGS. 8A and 8B are views illustrating an angle sensor according to the present invention, of which 8A is a view illustrating the construction of an angle sensor, and 8B is a view illustrating an output which is obtained by electrically changing a variation of a resistance output of an angle sensor based on a circuit.

First, the construction of the angle sensor 14 for measuring a moving angle will be explained with reference to FIG. 8A. The angle sensor 14 includes a cylindrical resistance surface 17 which electrically disconnects in a reference direction. A terminal A0 is formed at one end of the resistance surface 17. A terminal A1 is formed at the ceiling portion 15 contacting with the ball 12 at a contact point R1 which contacts at a contact point R0 on the circular resistance surface based on the moving direction of the ball holder 11. The terminals are electrically connected each other by the ball 12. The terminal A0 is fixed at a body of the angle sensor 14, and the terminal A1 is fixed at the ceiling portion 15. The ball 12 contacting with the terminals A0 and A1 moves on the resistance surface 17 based on a moving direction of the ball holder 11 irrespective of the moving direction of the ball holder 11.

Figure 8B:
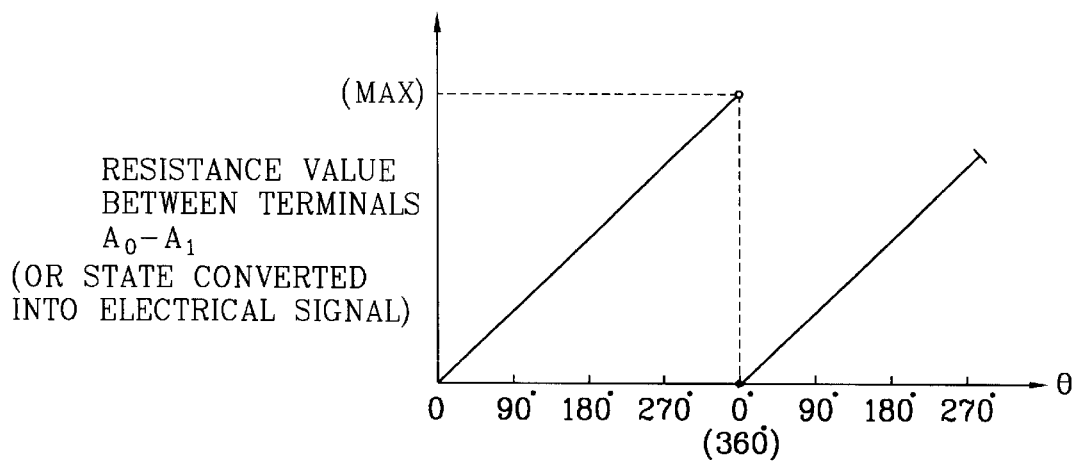

FIG. 8B illustrates an output state which is obtained by converting a variation of the resistance output of the angle sensor 14 into an electrical signal by a circuit. The variation of the resistance value of the angle sensor 14 is maximum when the ball 12 is positioned at a point of the reference direction of the angle sensor 14. As the ball 12 is moved based on a moving direction of the ball holder 11, the resistance is increased. In addition, the resistance value is maximized at the end stage of one rotation of the ball. The resistance surface 17 is a circular shape which is electrically disconnected. Therefore, when the ball 12 is continuously moved, the resistance value is started at the minimum value. In the movement of the ball 12, the output of the angle sensor 14 repeats the above-described operation.

The output(the value changed to an electrical signal) of the angle sensor 14 becomes a moving angle from the reference direction with respect to the moving direction of the movable coordinate input apparatus 10. In addition, as shown in FIG. 8B, the output changed to an electrical signal based on the reference direction of the angle sensor 14 is the minimum value. The output changed to an electrical signal based on the reference direction of the angle sensor 14 may be the maximum value in accordance with the construction of the circuit capable of changing a signal to an electrical signal.

Figures 10A, 10B:
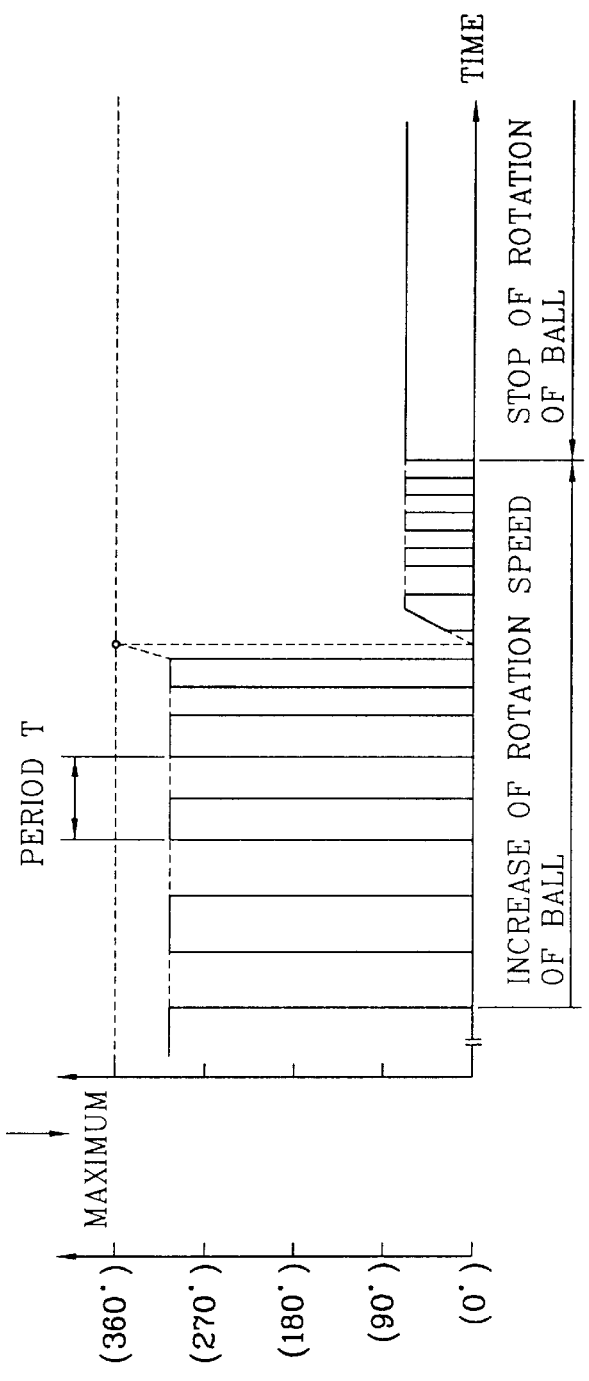
FIGS. 10A and 10B are views illustrating an output of an angle sensor according to the present invention, of which 10A is an output when light moves, and 10B is a view illustrating a wave form for describing a measurement of a rotation speed of a ball.

FIG. 10A illustrates an output of the angle sensor 14 when the ball holder 11 is moved. When measuring the moving speed, the number N of pulses is counted at every sampling period. When the ball 11 is moved, the moving angle corresponds to the size of an amplitude of the pulse output.

Figure 9A:
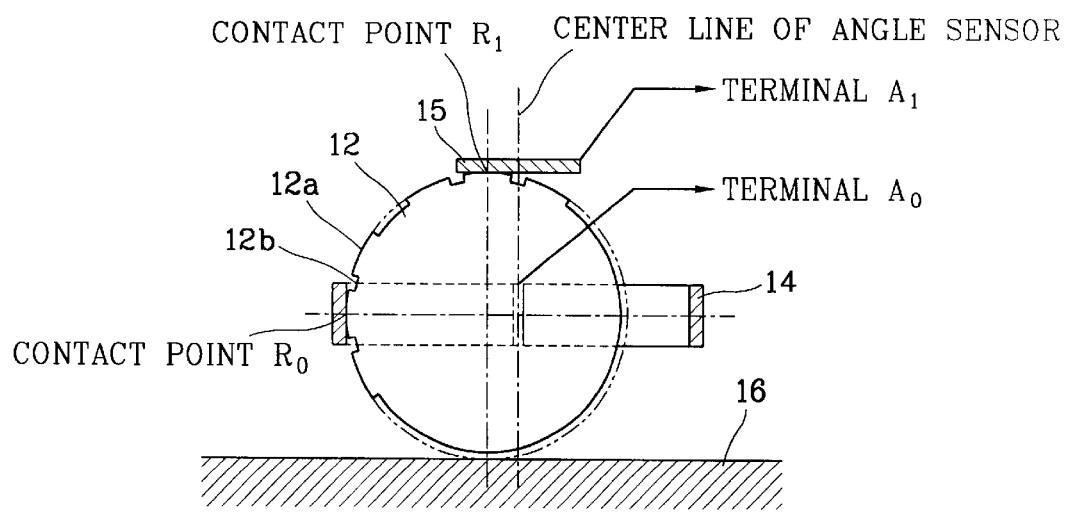
FIGS. 9A and 9B are views illustrating the construction of a speed sensor for measuring a rotation speed of a ball according to the present invention, of which 9A is a view illustrating the construction, and 9B is a view illustrating a surface construction of a ball.
Figure 9B:
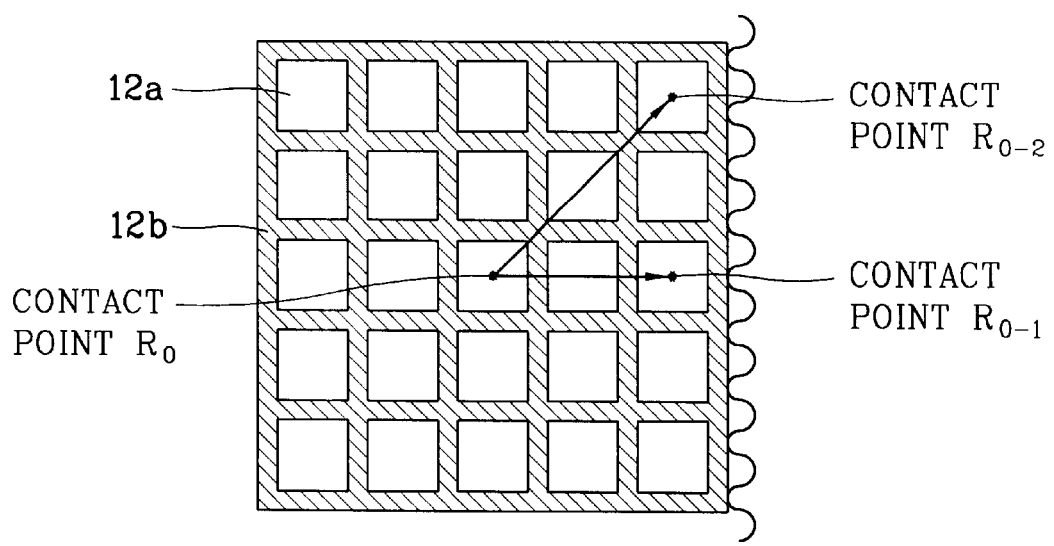

Next, the measurement of the moving speed will be explained with reference to FIGS. 9A and 9B. FIG. 9A illustrates a construction for measuring the moving speed. The above-described construction is formed of an angle sensor 14 and a ceiling portion 15 fixed in the ball holder 11, and the ball 12 held in the ball holder 11. FIG. 9B illustrates the construction of a net-shaped electrical insulation portion 12b of the surface of the ball 12.

In the electrical insulation portion 12b of the surface of the ball 12, other electrical conductive portion 12a of the surface of the ball 12 contacts with the ceiling plate 15 at the contact point R1 when the angle sensor 14 and the electrical conductive portion 12a of the surface of the ball 12 contact each other at the contact point R0. Therefore, when the ball 11 is moved, in the case that the angle sensor 14 contacts with the electrical conductive portion 12a of the surface of the ball 12, the angle sensor 14 and the ceiling plate 15 contact at the contact point R0 and become an electrically contacted state through the inner portion of the ball 12 being electrically conductive and the contact point R1.

FIG. 10A illustrates an output of the angle sensor 14 based on the construction of FIGS. 9A and 9B, and FIG. 10B is a wave form for describing a measurement of the rotation speed of the ball 12 using a pulse wave form of FIG. 10A.

The value of the vertical coordinate corresponds to the value used for measuring the moving angle based on the angle sensor 14(as shown in FIG. 8B). Therefore, the value of the vertical coordinate is constant(horizontal), it represents that the moving direction of the ball holder 11 is a certain uniform direction, and the value of the vertical coordinate is changed(slope), it represents that the moving direction of the ball holder 11 is continuously changed.

Since the values of the vertical coordinate of FIG. 10B correspond to the moving angle, the above-described value is shown by a rectangular wave form for simplifying the values.

When the ball 12 is rotated based on the movement of the ball holder 11, the movement of the contact point of the angle sensor 14 and the electrical conductive portion 12a of the surface of the ball 12 is performed (contact point R0→ contact point R0 or R0-2. At this time, since the output of the angle sensor 14 passes through the electrical insulation portion 12b, the output is illustrated in a pulse shape. In addition, when the rotation speed of the ball 12 is increased, the repeating time(period T of the pulse wave form) of the contacts between the angle sensor 14 and the electrical conductive portion 12a/insulation portion 12b of the surface of the ball 12 is decreased, and when the rotation of the ball 12 is stopped, an output corresponding to the contact states between the angle sensor 14 and the electrical conductive portion 12a/insulation portion 12b of the surface of the ball 12 is continuously outputted.

As shown in FIG. 10B, the number N of pulses from the angle sensor 14 are counted at each sampling period of S0, S1, S2, . . . , Sn-1, Sn, Sn+1. The number N of counts represents a moving distance of the moving direction of the coordinate input apparatus 10 at every sampling period. The moving speed of the moving direction at every sampling period of the coordinate input apparatus 10 is computed based on the moving distance/sampling period.

Next, the computation of the X/Y direction component of the moving speed and moving distance of the movable coordinate input apparatus according to the present invention will be explained.

Figure 11:
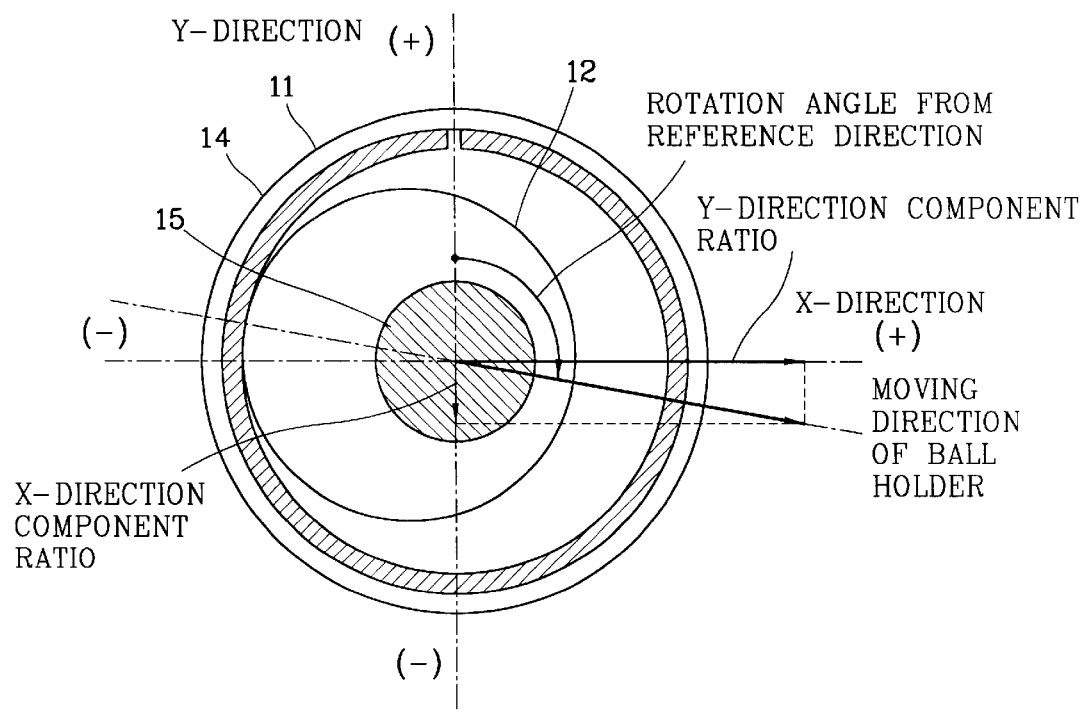
FIG. 11 is a view illustrating a vector value for describing a computation of X-/Y-direction components in the case that a coordinate input apparatus according to the present invention is moved at a certain speed.

FIG. 11 illustrates a view for describing the computation of the X/Y direction component ratios in the case that the coordinate input apparatus 10 is moved at a certain speed in a certain direction based on the state of FIG. 7.

The reference direction of the angle sensor 14 fixed in the ball holder 11 is assumed as a Y-direction. In addition, it is assumed that the angle from then reference direction to the moving direction is θ when the coordinate input apparatus 10 is moved at a certain speed in a certain direction. Therefore, the following Equations(1) and (2) are obtained.

$$\text{Y-direction component ratio of movement} = \cos(\theta) \quad (1)$$

$$\text{X-direction component of movement} = \sin(\theta) \quad (2)$$

Therefore, the ratios obtained based on the above Equations (1) and (2) are the X/Y direction components of the moving speed and moving distance of the coordinate input apparatus 10.

Therefore, the moving speed is measured using the electrical insulation portion 12b formed of nets on the surface of the ball 12. The number N of counts represents the moving distance of the moving direction of the coordinate input apparatus 10 of each sampling period with respect to a constant sampling period of a pulse output of the angle sensor 14. Therefore, the X/Y direction components NY and NX may be expressed as follows:

$$\text{Y-direction component(NY) of moving direction} = N \cdot \cos(\theta) \quad (3)$$

$$\text{X-direction component(NX) of moving direction} = N \cdot \sin(\theta) \quad (4)$$

In addition, the moving direction V of the moving direction of each constant sampling period of the coordinate input apparatus 10 is computed based on the moving distance/sampling period, the X/Y direction components VY and VX of the moving speed may be expressed as follows:

$$\text{Y-direction component VY of moving speed} = (NY)/\text{sampling period} = [N \cdot \cos(\theta)]/\text{sampling period} \quad (5)$$

$$\text{X-direction component NX of moving speed} = (NX)/\text{sampling period} = [N \cdot \sin(\theta)]/\text{sampling period} \quad (6)$$

Therefore, in the present invention, it is possible to obtain a X/Y direction component of the moving speed and moving distance or the moving speed and moving distance of the movable coordinate input apparatus.

As described earlier, in the present invention, the coordinate input apparatus is placed on a certain floor, and the ball 12 is rolled. In another embodiment of the present invention, the ball holder 11 may be installed on the top portion of the mouse, so that the ball 12 is rolled using a finger.

In the movable coordinate input apparatus according to the present invention, the X-direction and Y-direction relative coordinates of the coordinate input apparatus obtained based on the movement of the coordinate moving apparatus are measured by measuring the moving angle and rotation speed of the ball. Therefore, in the present invention, it is possible to decrease the number of parts compared to the conventional movable coordinate input apparatus, and a small size product may be fabricated, and an easier substitution with respect to the conventional coordinate input apparatus is implemented.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A movable coordinate input apparatus, comprising:

a ball; and a cylindrical hollow ball holder, wherein said ball includes an insulation portion formed in a net shape on a surface of the same and having a conductive characteristic, and said ball holder includes a ceiling plate on the top portion of the same, a conductive ceiling plate portion contacting with the ball when the ball holder is placed on a floor surface, and an angle sensor having an electrical resistance surface contacting with the ball on an inner surface of the ball holder.

2. The apparatus of claim 1, wherein a coordinate movement and moving speed are obtained by moving the ball holder in a state that the apparatus is placed on the floor surface.

3. The apparatus of claim 1, wherein a coordinate movement and moving speed are obtained by rotating a portion contacting with the floor surface of the ball using a finger.

4. The apparatus of claim 1, wherein the ball holder is formed in a cylindrical shape having a certain space therein in which the ball is movable.

5. The apparatus of claim 1, wherein said ball holder is formed in a polygonal cylindrical shape having a certain space therein in which the ball is movable.

6. The apparatus of claim 1, wherein said electrical insulation portion formed on the surface of the ball is formed in a rectangular net shape.

7. The apparatus of claim 1, wherein said electrical insulation portion formed on the surface of the ball is formed in a polygonal net shape.

8. The apparatus of claim 1, wherein said electrical insulation portion formed on the surface of the ball is formed in a circular net shape.

9. The apparatus of claim 1, wherein said electrical insulation portion formed on the surface of the ball is formed by filling an insulation material.

10. The apparatus of claim 1, wherein said electrical insulation portion formed on the surface of the ball is formed of a groove having a certain depth for thereby obtaining a non-contact with the ceiling plate and the angle sensor.

* * * * *